United States Patent
Su et al.

(10) Patent No.: US 6,686,907 B2
(45) Date of Patent: Feb. 3, 2004

(54) METHOD AND APPARATUS FOR INPUTTING CHINESE CHARACTERS

(75) Inventors: Hui Su, Beijing (CN); Qianying Wang, Stanford, CA (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 10/022,078

(22) Filed: Dec. 13, 2001

(65) Prior Publication Data

US 2002/0087605 A1 Jul. 4, 2002

(30) Foreign Application Priority Data

Dec. 21, 2000 (CN) ........................................ 00135491 A

(51) Int. Cl.[7] .................................................. G09G 5/00
(52) U.S. Cl. ...................... 345/171; 345/172; 382/185; 715/535
(58) Field of Search ................................ 345/171, 172; 382/185; 715/535

(56) References Cited

U.S. PATENT DOCUMENTS

| | | | |
|---|---|---|---|
| 4,829,583 A | | 5/1989 | Monroe et al. |
| 5,305,207 A | * | 4/1994 | Chiu ........................... 715/535 |
| 5,307,267 A | | 4/1994 | Yang |
| 5,790,055 A | * | 8/1998 | Yu ................................ 341/28 |
| 6,003,049 A | * | 12/1999 | Chiang ........................ 715/535 |
| 6,054,941 A | * | 4/2000 | Chen ............................ 341/28 |
| 6,094,666 A | * | 7/2000 | Li ................................ 715/535 |
| 6,362,752 B1 | * | 3/2002 | Guo et al. .................... 341/28 |

OTHER PUBLICATIONS

"Kanji Character Generation", IBM Technical Disclosure Bulletin, pp 4576–4578, (Apr. 1979).

* cited by examiner

*Primary Examiner*—Matthew C. Bella
*Assistant Examiner*—Po-Wei Chen
(74) *Attorney, Agent, or Firm*—Carlos Munoz-Bustamante

(57) ABSTRACT

The inputting apparatus and method is disclosed which associates at least two keys consecutively pressed with a corresponding Chinese character stroke. When a user presses keys associated with the strokes constituting a Chinese character, the inputting method of the invention will generate various strokes based on the user input and then meaningful Chinese character. Since the Chinese character inputting method according to the invention is only concerned with the direction of consecutively pressing at least two keys, it is only necessary for the user to consider the direction of depression of the keys corresponding to the strokes when inputting strokes without considering which key is to be pressed, thereby greatly reducing the memory burden of the user.

13 Claims, 3 Drawing Sheets

METHOD AND APPARATUS FOR INPUTTING CHINESE CHARACTERS

BACKGROUND OF THE INVENTION

This invention pertains to keypad entry of Chinese characters in devices such as personal computers, portable computers, mobile phones, and remote controllers.

Nowadays, when people input Chinese characters into electronic devices, such as computers and other pervasive devices, they usually employ the Pin Yin Inputting Method or the Five-stroke Inputting Method. When using these methods to input Chinese characters, the operator usually has to remember which key on the keyboard corresponds to which Pin Yin character, or which key corresponds to which stroke or root. Afterwards, it is necessary for the operator to locate the corresponding key in order to correctly input a Pin Yin or a stroke. Therefore it is quite inconvenient for the operator to both remember the layout of the keys on the keyboard, and search the keyboard for the corresponding keys. Hence it is an aim in this field to design a new Chinese character inputting method which can be easily memorized and used to greatly reduce the burden of the operator.

SUMMARY OF THE INVENTION

It is a purpose of this invention to provide a method and an apparatus for inputting Chinese characters straightforwardly, which can reduce the time for searching the keyboard and the burden of memorization.

For realizing the above goal, the invention provides a Chinese character inputting apparatus used by the users to input Chinese characters. The apparatus includes, for example, ten keys arranged in a keypad layout, wherein Chinese stroke "—" is represented by consecutively pressing at least two keys in a horizontal direction;

Chinese stroke " | " is represented by consecutively pressing at least two keys in a vertical direction;

Chinese stroke " ノ " is represented by consecutively pressing at least two keys in the left-lower direction from a first pressed key;

Chinese stroke " ヽ " is represented by consecutively pressing at least two keys in the right-lower direction from a first pressed key;

Chinese stroke " / " is represented by consecutively pressing at least two keys in the right-upper direction from a first pressed key;

the other Chinese character strokes are represented by consecutively pressing two keys located respectively at the left-upper corner and right-lower corner of a keypad, or by consecutively pressing two keys located respectively at the right-upper corner and left-lower corner of a keypad. A conversion of the input information into the corresponding Chinese characters is then performed by the apparatus.

Moreover, the invention provides a method for inputting Chinese characters including; using ten keys arranged in a keypad layout to input Chinese characters, wherein Chinese stroke " — " is represented by consecutively pressing at least two keys in a horizontal direction;

Chinese stroke " | " is represented by consecutively pressing at least two keys in a vertical direction;

Chinese stroke " ノ " is represented by consecutively pressing at least two keys in the left-lower direction from a first pressed key;

Chinese stroke " ヽ " is represented by consecutively pressing at least two keys in the right-lower direction from a first pressed key;

Chinese stroke " / " is represented by consecutively pressing at least two keys in the right-upper direction from a first pressed key;

the other Chinese strokes are represented by consecutively pressing two keys located respectively at the left-upper corner and right-lower corner of a keypad, or by consecutively pressing two keys located respectively at the right-upper corner and left-lower corner of a keypad, and converting the strokes input by the user in the above-mentioned steps into the corresponding Chinese characters.

The inputting method of the invention associates at least two consecutively pressed keys with a corresponding Chinese character stroke. When the user consecutively presses at least two keys associated with a stroke constituting a part of a Chinese character, the inputting method of the invention will generate the stroke according to the user input and then result in meaningful Chinese characters based on the inputted strokes. Since the method according to the invention is only concerned with the direction in which at least two keys are consecutively pressed, when a user wants to input the strokes, it is only necessary for him/her to remember the direction in which the keys are pressed corresponding to a stroke without considering which keys to select, thereby greatly reducing the memorization burden.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Referring now more particularly to the accompanying drawings, below Embodiments 1 through 4 are illustrated.

Embodiment 1

In the inputting method and apparatus according to the invention, the components of Chinese characters are classified into six categories of strokes based on the customary hand writing style of the Chinese characters, which are used to constitute any kind of Chinese characters. Among the six categories of strokes, the former five categories are the fundamental strokes of the Chinese characters, namely: "—, |, ノ, ヽ, /", and the other strokes not included in these five categories come into the sixth category.

Figure 1:
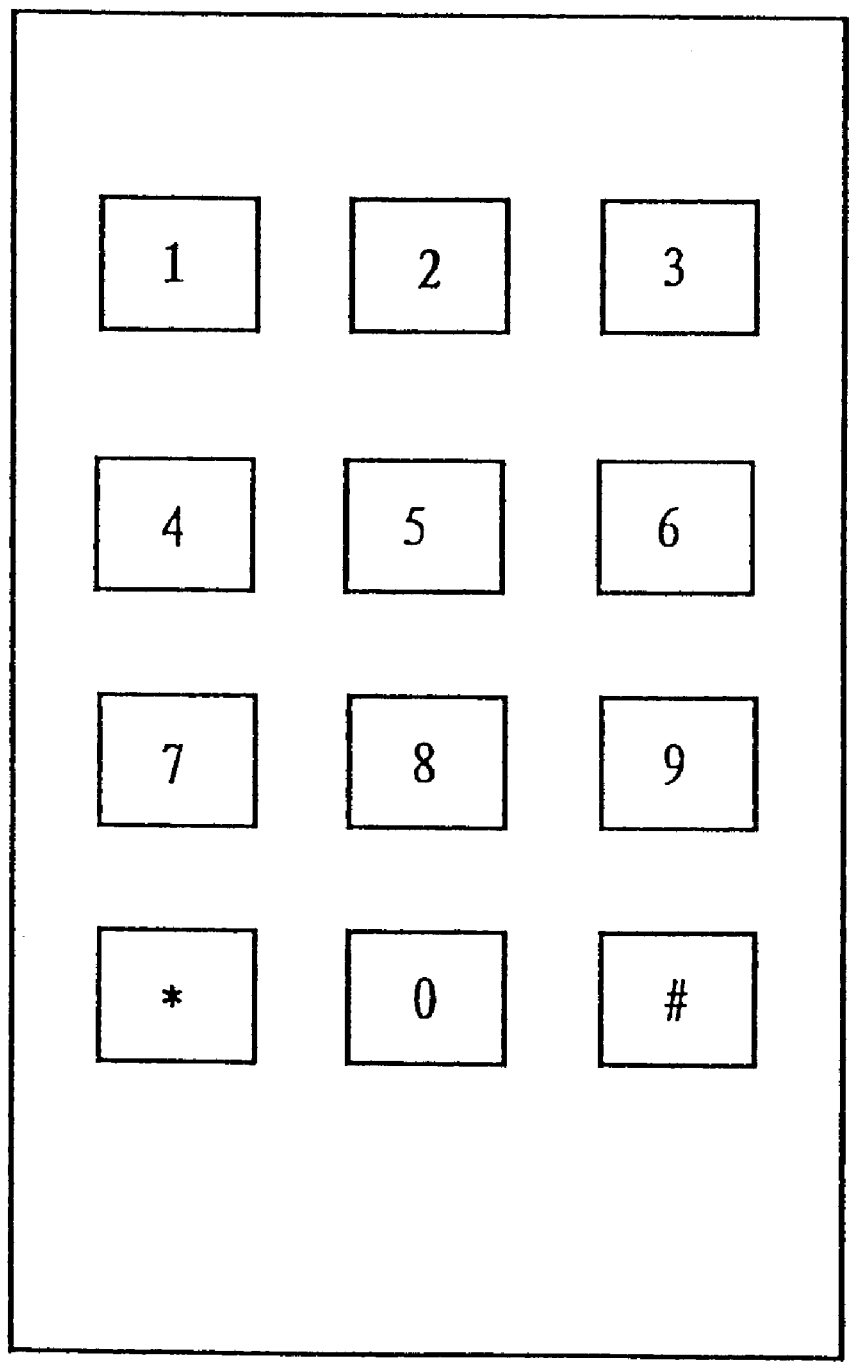
FIG. 1 is the layout of the input keypad according to the invention.

Moreover, the first embodiment according to the invention associates the writing direction of each category of strokes with the direction of pressing two keys on the keypad to form a correspondence relationship. As shown in FIG. 1, the relationships between these six categories of strokes and the keys located on the keypad of the inputting apparatus according to the invention are as follows:

"—" corresponds to (1,2), (2,3), (4,5), (5,6), (7,8), (8,9);

"丨" corresponds to (1,4), (4,7), (2,5), (5,8), (8,0), (3,6), (6,9);

"丿" corresponds to (2,4), (3,5), (5,7), (6,8), (9,0);

"丶" corresponds to (1,5), (2,6), (4,8), (5,9), (7,0);

"/" corresponds to (4,2), (5,3), (7,5), (8,6), (0,9).

The sixth category of strokes includes those strokes not included in the above-mentioned five categories, for example:

"国" etc. correspond to (1, 9), (3, 7).

In such a way, when a user inputs a Chinese character, he/she needs only consecutively press the keys representing different strokes according to the customary hand writing style without remembering which meanings the keys on the keypad represent.

Figure 2:
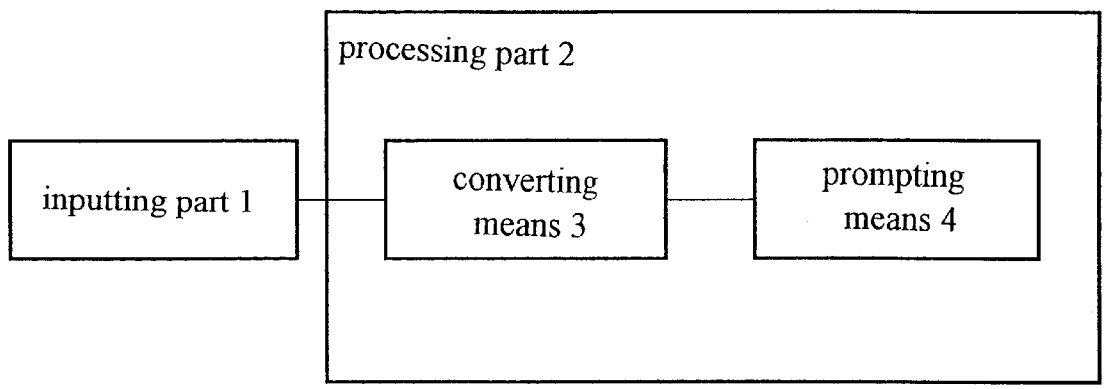
FIG. 2 is the block diagram of the Chinese character inputting apparatus according to the invention.
Figure 3:
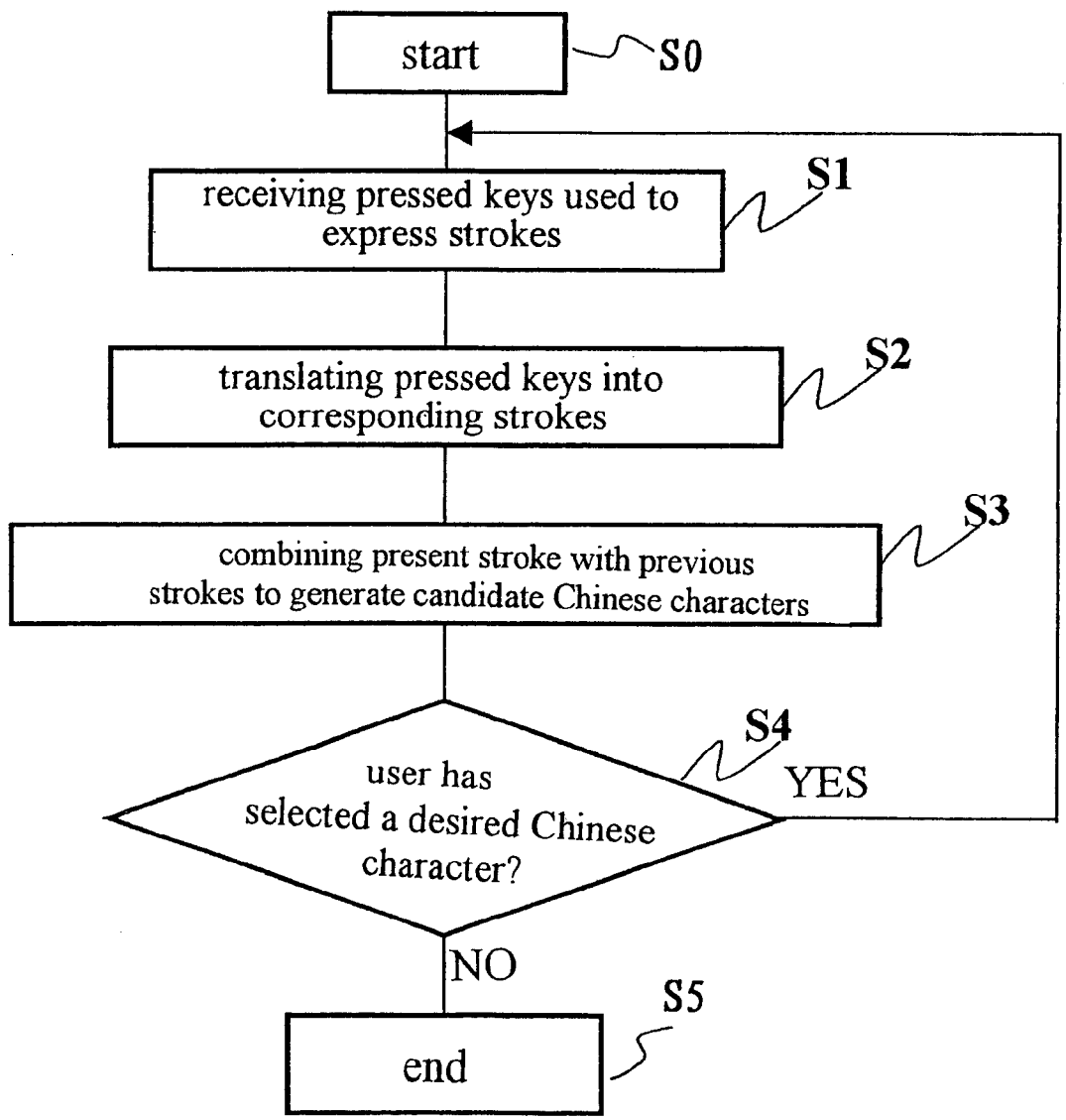
FIG. 3 is the flow diagram of inputting Chinese characters according to the invention.

Referring now to FIG. 2 and FIG. 3, an explanation on how to input Chinese characters by using the inputting apparatus and the inputting method according to the present invention.

As shown in FIG. 2, the inputting apparatus according to the invention comprises an input part 1 having the above-mentioned layout for use by the user to input strokes, such as the keypad shown in FIG. 1; a processing part or mechanism 2 for processing the input information, which comprises a converter or converting means 3 for converting strokes the user inputs via the keypad into the corresponding Chinese characters. In addition, the processing part 2 may further comprise a prompter or prompting means 4 for displaying all the produced candidate Chinese characters based on the stroke input by the user.

An explanation of how to input Chinese characters with reference to FIG. 3 will now ensue.

Taking the Chinese character "国" as an example, it is formed by the following strokes: 国 丨 𠃍 一 一 丨 丶 一, When the user inputs Chinese character "国" by using the inputting apparatus of the invention, firstly he/she presses any one of the key groups (1,4), (4,7), (2,5), (5,8), (8,0), (3,6), (6,9) representing "丨";

then he/she presses any one of the key groups (1,9), (3,7) representing "𠃍";

and then he/she presses any one of the key groups (1,2), (2,3), (4,5), (5,6), (7,8), (8,9) representing "—", and so forth (S1, S2, S3).

Hence the user will be able to all the input Chinese character strokes constituting the Chinese character "国" by pressing the keys according to the hand writing sequence of Chinese character "国".

Hereafter, the inputting apparatus according to the invention combines the input strokes to generate Chinese characters and display them to the user (S3).

Furthermore, the inputting apparatus according to the invention has a prompting function, with which each time the user inputs a stroke constituting a Chinese character, the inputting apparatus according to the invention will display all the candidate Chinese characters containing the input strokes input herebefore so that the user does not have to input all the strokes of that Chinese character to get the described Chinese character.

For example, when the user inputs the above-mentioned "国" by firstly inputting the first stroke "丨", the inputting apparatus according to the invention will display all the candidate Chinese characters containing the stroke "丨", such as "上、卜、山、出、口、田、巾、国、. . . ". Afterwards, when the user inputs the second stroke "𠃍", the inputting apparatus according to the invention will display all the candidate Chinese characters containing strokes "丨 𠃍", such as "口、日、出、巾、同、刚、囚、···图. . .口、日、出、巾、同、刚、囚、···困". Later when the user inputs the third stroke "—", the inputting apparatus according to the invention will display all the candidate Chinese characters containing strokes "丨 𠃍 —", such as "口、日、田、囯、囝、国、显、署、. . .".

In such a way, the user will be able to select the desired Chinese character "国" after he/she inputs the third stroke, thereby greatly improving the inputting efficiency.

Embodiment 2

Embodiment 1 is an example for consecutively inputting two keys on the keypad to express a Chinese character stroke. However, it is also possible to consecutively input more than two keys on the keypad such as three or four keys to express a Chinese character stroke, so far as the direction of arrangement of these keys is the same as the direction of the hand written strokes.

Embodiment 3

In embodiments 1 and 2, a fixed number of keys, such as two or more, are used for expressing a stroke. In such a way the user has to remember how many keys are to be pressed to express a stroke. Compared with the previous embodiments, this embodiment adds a separating key to signify the end of inputting a stroke when the user presses all the keys expressing a stroke.

In such a way, the user is able to arbitrarily input more than two keys and a separating key according to the direction of a stroke to be input to express the input stroke as he/she likes without considering how many keys are to be pressed.

Embodiment 4

In embodiment 3 the user should press a separating key when he/she finishes inputting a stroke, thereby increasing the times for pressing the keys. Compared with embodiment 3, in this embodiment there is a stroke combiner added so that the separating key can be omitted. According to this embodiment, the user does not have to press a separating key when he/she successively inputs the strokes, the stroke combiner will select the most likely candidate Chinese character(s) for the user based on the strokes input by the user.

Taking "上" as an example, the user can successively press 2, 5, 8, 1, 2, 1, 2, 3 (wherein (2,5,8) represents "丨", (1,2) represents "—" and (1,2,3) represents "—", then the stroke combiner according to the invention selects the most likely candidate Chinese characters (or character) for the user based on this input sequence. In such a way, it is not necessary for the user to input any separating key or to pay attention to how many keys (two, three or four) should be pressed to input a stroke, he/she can press an arbitrary number of keys according to the direction of the stroke as he/she likes so as to express a stroke constituting a part of a Chinese character.

In the drawings and specifications there has been set forth a preferred embodiment of the invention and, although specific terms are used, the description thus given uses terminology in a generic and descriptive sense only and not for purposes of limitation. The words horizontal, vertical, up, down, diagonally etc., used in the description above all refer to orientations or directions as if along a piece of paper; or, more specifically, as if largely along a plane defined by the keypad.

We claim as our invention:

1. A Chinese character inputting apparatus, comprising:
    a keypad having a predetermined number of keys; and
    a converter which converts depressed key information generated by said keypad into stroke data corresponding to character strokes, wherein the depressed key information for each provided Chinese stroke is entered by the pressing of any two or more keys of said keypad, and wherein:
        the Chinese stroke "—" is entered by pressing at least a first pair of horizontally oriented keys,
        the Chinese stroke "│" is entered by pressing at least second pair of vertically oriented keys,
        the Chinese stroke "丿" is entered by pressing at least a third pair of keys oriented consecutively toward a lower-left direction,
        the Chinese stroke "乀" is entered by pressing at least a fourth pair of keys oriented consecutively toward a lower-right direction,
        the Chinese stroke "/" is entered by pressing at least a fifth pair of keys oriented consecutively toward an upper-right direction,
    and an additional predetermined set of character strokes are entered by pressing two keys located respectively at peripherally opposing areas of said keypad.

2. Apparatus according to claim 1, wherein one key of said keypad is designated as a separation key for separating the character strokes.

3. Apparatus according to claim 1, wherein said converter further comprises a stroke combiner which generates likely candidate Chinese characters corresponding to the entered character strokes.

4. Apparatus according to claim 1, further comprising:
    a prompter, coupled to said converter, wherein said prompter displays candidate Chinese characters containing the entered character strokes.

5. Apparatus according to claim 4, wherein one key of said keypad is designated as a separation key for separating the character strokes.

6. Apparatus according to claim 4, wherein said converter further comprises a stroke combiner which generates likely candidate Chinese characters corresponding to the entered character strokes for display on said prompter.

7. A Chinese character inputting method, comprising the steps of:
    accepting depressed key information from a keypad having a predetermined number of keys, the depressed key information representing constituent character strokes which form Chinese characters; and
    converting the depressed key information representing character strokes into the corresponding Chinese characters, wherein the depressed key information for each provided Chinese stroke is entered by the pressing of any two or more keys of the keypad, and wherein:
        the Chinese stroke "—" is entered by pressing at least a first pair of horizontally oriented keys,
        the Chinese stroke "│" is entered by pressing at least second pair of vertically oriented keys,
        the Chinese stroke "丿" is entered by pressing at least a third pair of keys oriented consecutively toward a lower-left direction,
        the Chinese stroke "乀" is entered by pressing at least a fourth pair of keys oriented consecutively toward a lower-right direction,
        the Chinese stroke "/" is entered by pressing at least a fifth pair of keys oriented consecutively toward an upper-right direction,
    and an additional predetermined set of character strokes are entered by pressing two keys located respectively at peripherally opposing areas of said keypad.

8. The method according to claim 7, further comprising the steps of:
    designating one of the predetermined number of keys as a separation key; and
    separating the entered character strokes upon detecting the separation key.

9. The method according to claim 7, further comprising the step of
    generating likely candidate Chinese characters corresponding to the entered character strokes which constitute a Chinese character.

10. The method according to claim 7, further comprising the step of displaying candidate Chinese characters containing the entered character strokes.

11. The method according to claim 10, further comprising the steps of:
    designating one of the predetermined number of keys as a separation key; and
    separating the entered character strokes upon detecting the separation key.

12. The method according to claim 10, further comprising the step of generating likely candidate Chinese characters corresponding to the entered character strokes which constitute a Chinese character.

13. A computer program product comprising:
    a computer usable medium having computer readable program code embodied therein for inputting Chinese characters, the computer readable program code in said computer program product effective in executing the steps of:
    accepting depressed key information from a keypad having a predetermined number of keys, the depressed key information representing constituent character strokes which form Chinese characters; and
    converting the depressed key information representing character strokes into the corresponding Chinese characters, wherein the depressed key information for each provided character stroke is entered by the pressing of any two or more keys of the keypad, and wherein:
        the Chinese stroke "—" is entered by pressing at least a first pair of horizontally oriented keys,
        the Chinese stroke "│" is entered by pressing at least second pair of vertically oriented keys,
        the Chinese stroke "丿" is entered by pressing at least a third pair of keys oriented consecutively toward a lower-left direction,
        the Chinese stroke "乀" is entered by pressing at least a fourth pair of keys oriented consecutively toward a lower-right direction,
        the Chinese stroke "/" is entered by pressing at least a fifth pair of keys oriented consecutively toward an upper-right direction,
    and an additional predetermined set of Character strokes are entered by pressing two keys located respectively at peripherally opposing areas of said keypad.

* * * * *